(12) United States Patent
Hull et al.

(10) Patent No.: US 9,362,036 B2
(45) Date of Patent: Jun. 7, 2016

(54) MAGNETIC COMPOSITE STRUCTURES WITH HIGH MECHANICAL STRENGTH

(75) Inventors: John R. Hull, Sammamish, WA (US); Michael Strasik, Sammamish, WA (US); Mark S Wilenski, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 1915 days.

(21) Appl. No.: 12/535,376

(22) Filed: Aug. 4, 2009

(65) Prior Publication Data

US 2011/0031431 A1 Feb. 10, 2011

(51) Int. Cl.

| | |
|---|---|
| *D01F 1/02* | (2006.01) |
| *D01F 8/04* | (2006.01) |
| *D06M 23/08* | (2006.01) |
| *H01F 7/02* | (2006.01) |
| *H01F 1/117* | (2006.01) |
| *H01F 1/00* | (2006.01) |
| *H01F 1/08* | (2006.01) |
| *H01F 41/02* | (2006.01) |

(52) U.S. Cl.
CPC .............. *H01F 7/0221* (2013.01); *H01F 1/083* (2013.01); *H01F 41/0273* (2013.01)

(58) Field of Classification Search
CPC ... H01F 7/0221; H01F 41/0273; H01F 1/083; H01F 7/02; H01F 1/00; H01F 1/032; H01F 1/117; H01F 7/0215; H01F 1/0027; D03D 15/00; D03D 15/083; D03D 15/08; D03D 27/00; D03D 15/0055; D03D 15/0027; D01F 1/10; D02G 3/00; Y10T 428/2933; Y10T 428/2927; Y10T 428/294; Y10T 428/2973; Y10T 428/2931; Y10T 428/2929; D10B 2101/20; D10B 2201/28; D10B 2321/02; D10B 2401/16; D10B 2501/00; D10B 2321/10; D10B 2331/04; D10B 2503/04; D10B 2101/12; D10B 2211/02; D10B 2201/24; D10B 2331/10; D10B 2211/04; D10B 2331/02; D10B 2401/061; D10B 2201/02; D10B 2503/02; D10B 2503/06; D01D 5/30; A46D 1/023; A46D 1/0238; A46D 1/00

USPC ............ 428/36.1, 36.4, 221, 283, 293.1, 294, 428/295, 296, 299.1, 323, 338, 402, 408, 428/373, 370, 375, 900, 903, 372, 379, 374, 428/397; 264/427; 310/74, 90.5; 335/303; 442/189; 427/487; 252/62.54, 62.51 R

See application file for complete search history.

(56) References Cited

U.S. PATENT DOCUMENTS 3,257,586 A * 6/1966 Steingroever ................ 335/303
3,437,974 A * 4/1969 Spiegler ...................... 338/300
5,468,529 A * 11/1995 Kwon et al. ................. 428/36.1

(Continued)

FOREIGN PATENT DOCUMENTS

GB 2133737 A * 8/1984
JP 04119141 A * 4/1992

OTHER PUBLICATIONS

Rare Earth Iron Permanent Magnets, J.M.D. Coey, Oxford Science Publications 1996.

*Primary Examiner* — Jennifer Chriss
*Assistant Examiner* — Altrev Sykes
(74) *Attorney, Agent, or Firm* — Yee & Associates, P.C.

(57) ABSTRACT

Magnetic fiber structures include a fiber and a plurality of permanent magnet particles carried by the fiber.

21 Claims, 7 Drawing Sheets

(56) References Cited

U.S. PATENT DOCUMENTS

| | | | |
|---|---|---|---|
| 5,477,092 A | 12/1995 | Tarrant | |
| 5,717,263 A * | 2/1998 | Cox | 310/74 |
| 5,744,090 A * | 4/1998 | Jones et al. | 264/427 |
| 5,843,567 A * | 12/1998 | Swift et al. | 428/221 |
| 6,211,589 B1 | 4/2001 | Ahlstrom et al. | |
| 6,695,992 B2 * | 2/2004 | Reneker | 264/29.1 |
| 2003/0059609 A1 * | 3/2003 | Rodgers | 428/373 |
| 2004/0203306 A1 * | 10/2004 | Grafe et al. | 442/189 |
| 2007/0003761 A1 * | 1/2007 | Miyazono et al. | 428/375 |
| 2008/0256735 A1 * | 10/2008 | Campbell | 15/220.2 |

* cited by examiner

MAGNETIC COMPOSITE STRUCTURES WITH HIGH MECHANICAL STRENGTH

TECHNICAL FIELD

The present disclosure relates to magnetic structures for high-speed applications. More particularly, the present disclosure relates to magnetic composite structures which are suitable for fabrication of high-speed bearings, generators, rotating machinery and other applications requiring high strength.

BACKGROUND

Permanent magnets (PMs) are used in many applications, in particular as the source of magnetomotive force in motors and generators and as the source of magnetic flux in magnetic bearings. In high-temperature superconducting (HTS) bearings, the rotor of the bearing is typically a PM structure and the stator is an array of HTS elements. PMs used in rotating machinery may utilize either metal or composite overwrap to increase their design limit for high speed rotation, but even with this design the ultimate performance of motors and generators may be limited.

In the case of the HTS bearing, the mechanical strength of the PM may limit the maximum speed at which the bearing can operate. PM materials with the highest energy products and highest available flux, e.g., FeBNd materials, tend to be sintered ceramics that are brittle and have tensile strengths of the order of 10,000 psi. It is possible to increase the maximum rotational speed of the PM rotor by banding the PM on the outside of its circumference either with a high-strength steel material or with a fiber composite material, such as graphite fiber in an epoxy matrix. While such a banding increases the maximum speed, the speed may still be limited.

One of the disadvantages of any permanent magnet structure in which strengthening material is substituted for the magnet material is that as the volume fraction of magnet material decreases, so does the energy product and the available flux. This may decrease the load-carrying capacity of an HTS bearing and the power rating of a motor or generator.

Therefore, magnetic composite structures with high mechanical strength in which magnetic powder is intimately mixed into composite structures to provide permanent magnets of high mechanical strength are needed.

SUMMARY

The present disclosure is generally directed to a magnetic fiber structure. An illustrative embodiment of the magnetic fiber structure includes a fiber and a plurality of permanent magnet particles carried by the fiber.

The present disclosure is further generally directed to a magnetic composite structure. An illustrative embodiment of the magnetic fiber structure includes a polymer matrix and a magnetic fiber structure provided in the polymer matrix. The magnetic fiber structure may include a fiber and a plurality of permanent magnet particles carried by the fiber.

The present disclosure is further generally directed to a method of fabricating a magnetic composite structure. An illustrative embodiment of the method includes providing a plurality of permanent magnet particles, providing a fiber, combining the permanent magnet particles with the fiber, providing a polymer matrix and providing the fiber in the polymer matrix.

In some embodiments, the magnetic composite structure may include a polymer matrix and a magnetic fiber structure provided in the polymer matrix. The magnetic fiber structure may include a fiber tube having a tube interior provided in the polymer matrix and comprising a material selected from the group consisting of E-glass fiberglass, S-glass fiberglass and graphite and a plurality of permanent magnet particles provided in the tube interior of the fiber tube and comprising a material selected from the group consisting of FeBNd and SmCo. The permanent magnet particles each may include a single-grain material with similar crystalline orientation throughout the permanent magnet particles.

In some embodiments, the method of fabricating a magnetic composite structure may include pre-selecting permanent magnet particles according to size; placing the permanent magnet particles in a loading sleeve; placing a fiber tube around the loading sleeve; ensuring a snug fit of the fiber tube with the permanent magnet particles; applying a magnetic field to the permanent magnet particles; orienting the fiber tube in alignment with an easy axis of magnetization of the permanent magnet particles; and winding the fiber tube to form a magnetic composite structure.

In some embodiments, the magnetic fiber structure may include an outer tube, an inner tube provided in the outer tube and a plurality of permanent magnetic particles provided in the inner tube.

The present disclosure is generally directed to a method of fabricating a magnetic fiber structure. An illustrative embodiment of the method includes providing an extruder apparatus comprising a triple nozzle having an exit and an outer nozzle, a middle nozzle and an inner nozzle communicating with the exit; a first feed tank disposed in fluid communication with the middle nozzle; a second feed tank disposed in fluid communication with the outer nozzle; and forming an inner tube of the magnetic fiber structure by providing a first molten or softened material in the first feed tank and delivering the first molten or softened material through the middle nozzle and the exit; forming an outer tube of the magnetic fiber structure by providing a second molten or softened material in the second feed tank and delivering the second molten or softened material through the outer nozzle and the exit; and forming permanent magnetic particles in the inner tube by delivering magnetic particles through the inner nozzle and the exit.

An alternative method of fabricating a permanent magnetic structure may include providing an extruder apparatus comprising a furnace, a forehearth communicating with the furnace, a nozzle communicating with the forehearth, an entrance for fiber material communicating with the furnace and an entrance for magnetic particles communicating with the forehearth; and providing fiber material in the furnace and the forehearth through the entrance for fiber material; providing magnetic particles in the forehearth through the entrance for magnetic particles; and distributing the fiber material and the magnetic particles through the nozzle.

Another alternative method of fabricating a permanent magnetic structure may include providing preform including fiber material slab, inserting magnetic particles into the preform, inserting the preform into an extruder, softening the fiber material slab and extruding fiber from the fiber material slab.

BRIEF DESCRIPTION OF THE ILLUSTRATIONS

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Furthermore, there is no intention to be bound by any expressed or implied theory presented in the preceding technical field, background, brief summary or the following detailed description.

Figure 1:
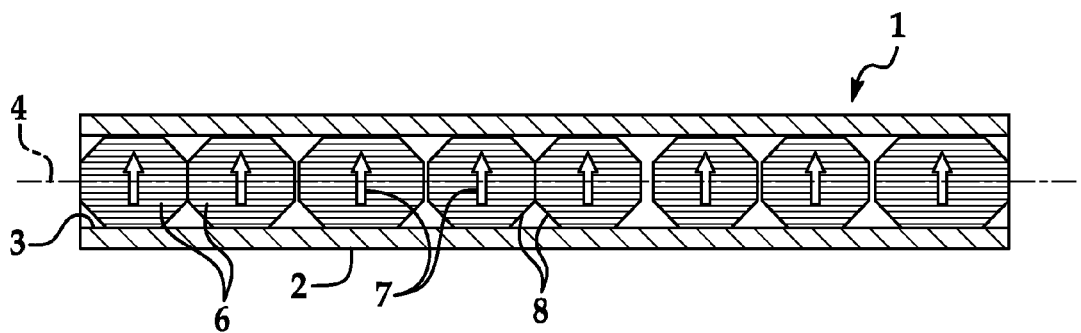
FIG. 1 is a longitudinal cross-sectional view of a magnetic fiber structure in which permanent magnetic particles are provided in a fiber tube.

Referring initially to FIG. 1, a magnetic fiber structure 1 which is suitable for fabrication of a magnetic composite structure 10 (FIG. 2) with high mechanical strength is shown. The magnetic fiber structure 1 has a longitudinal center line 4. The magnetic fiber structure 1 may include a generally elongated fiber tube 2 having a tube interior 3. The fiber tube 2 may be fiberglass such as E-glass or S-glass or may be graphite, for example and without limitation. The type of glass which is selected for the fiber tube 2 may have a relatively low processing temperature to prevent oxidation of magnetic particles 6 inserted therein; relatively low modulus to allow the magnetic particles 6 to strain a reasonable amount upon application of stress; and high fracture toughness ($K_{IC}$). In some embodiments, the fiber tube 2 may be a polymeric fiber material which may be created using a base polymer such as polyethylene. Polyethylene-based fibers such as SPECTRA (trademark) and DYNEEMA (trademark) have excellent mechanical performance and may be suitable for the purpose. In some embodiments, the outer diameter of the fiber tube 2 may be on the order of about 10 microns and the inner diameter of the fiber tube 2 may be on the order of about 6~8 microns. Actual dimensions of the fiber tube 2 may vary considerably depending on the application of the magnetic fiber structure 1.

Multiple permanent magnetic (PM) particles 6 may be provided in stacked or adjacent relationship in the tube interior 3 of the fiber tube 2. The PM particles 6 may be single-grain materials with similar crystalline orientation throughout the grain. Each PM particle 6 may be FeBNd or SmCo, for example and without limitation. In some embodiments, a buffer layer 8 may coat each PM particle 6 to prevent chemical interaction of the PM particle 6 with the fiber tube 2 during the drawing process. As shown in FIG. 1, the PM particles 6 in each fiber tube 2 need not necessarily be the same size. The shapes of the PM particles 6 in the fiber tube 2 may also vary. In some embodiments, spherical, ellipsoidal and cuboidal PM particles 6, for example and without limitation, may be placed in the tube interior 3 of a single fiber tube 2.

Each grain may include more than one magnetic domain. Each PM particle 6 may have an easy axis of magnetization 7. In some embodiments, the PM particles 6 may be aligned in such a manner that the easy axis of magnetization 7 of the PM particles 6 are aligned in the same direction along a substantial length or in substantially parallel relationship with respect to a longitudinal axis of the fiber tube 2. In some embodiments, the easy axis of magnetization 7 of each PM particle 6 may be oriented in transverse relationship with respect to a longitudinal axis of the fiber tube 2.

The magnetic fiber structure 1 may be fabricated according to any of a variety of fabrication methods. In one exemplary method of fabrication, the PM particles 6 may be pre-selected for size and then placed in a loading sleeve (not shown). The fiber tube 2 may then be drawn from a larger glass tube (not shown) which is placed around the loading sleeve. The drawing fixture (not shown) assures a snug fit of the tube interior 3 of the fiber tube 2 around each PM particle 6. A magnetic field may be applied in the region in which the PM particle 6 is inserted into the fiber tube 2 to orient the easy axis of orientation 7 in a preferred direction.

One advantage of the magnetic fiber structure 1 shown in FIG. 1 is that if the length of the fiber tube 2 increases, such as when wound in a rotor (not shown) and the speed of the rotor increases, the PM particles 6 can move with the local part of the fiber tube 2. In the event that cracks (not shown) form in the PM particles 6, the PM particles 6 are constrained by the walls of the fiber tube 2.

Figure 1A:
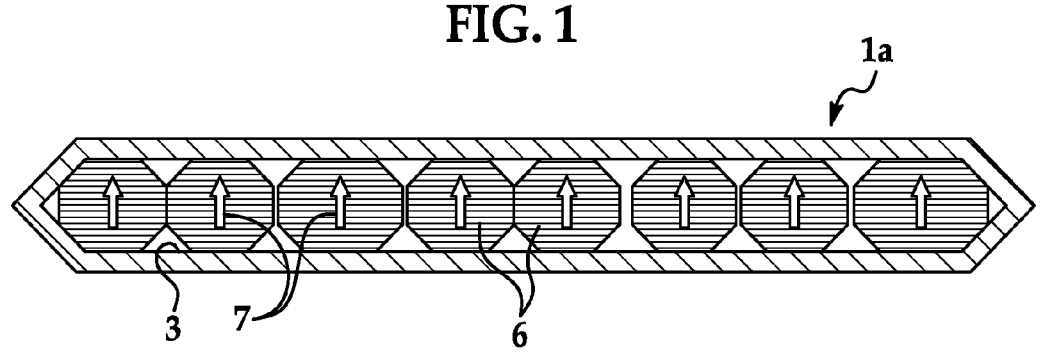
FIG. 1A is a transverse cross-sectional view of a magnetic fiber structure in which multiple permanent magnetic particles are provided across the width of the fiber structure.

In FIG. 1A, an alternative magnetic fiber structure 1a with flattened fiber geometry is shown in transverse cross-section.

Multiple PM particles 6 are provided in the tube interior 3 of the fiber tube 2 across the width of the magnetic fiber structure 1*a*.

Figure 1B:
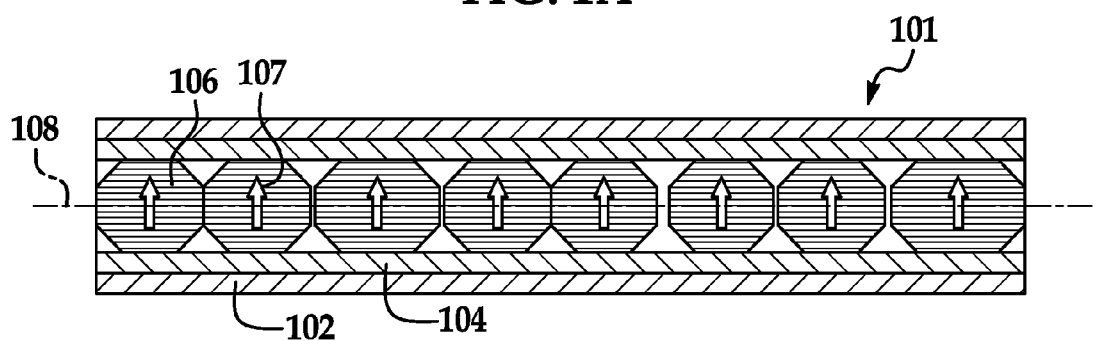
FIG. 1B is a transverse cross-sectional view of an alternative magnetic fiber structure.

Referring next to FIG. 1B, an alternative magnetic fiber structure 101 is shown. The magnetic fiber structure 101 may be a dual concentric hollow tube structure which includes an outer tube 102 and an inner tube 104 provided inside the outer tube 102. The coefficient of thermal expansion for the outer tube 102 may be lower than that of the inner tube 104. In some embodiments, the outer tube 102 may include S glass with a thermal expansion coefficient of 3.4 ppm/degC. and the inner tube 104 may include E glass with a thermal expansion coefficient of 6.0 ppm/degC. Permanent magnet particles 106 are provided in the inner tube 104. An easy axis of magnetization 107 of each permanent magnet particle 106 may be transverse to the longitudinal axis 108 of the magnetic fiber structure 101, as shown.

To counter the potential reduction in strength due to addition of permanent magnetic particles 106 to the magnetic fiber structure 101, the greater coefficient of thermal expansion of the particle-loaded inner tube 104 relative to that of the outer tube 102 may cause the inner tube 104 to put the outer tube 102 into compression upon cooling of the outer tube 102 and the inner tube 104. This compression effect may significantly enhance potential strength of the magnetic fiber structure 101.

The glass which is selected for the inner tube 104 may have the following characteristics: (1) relatively low processing temperature to avoid oxidation of the permanent magnet particles 106; (2) relatively low modulus to allow the permanent magnet particles 106 to strain a reasonable amount upon application of force; and (3) high fracture toughness ($K_{IC}$). For this application, chemical durability may not be important as the application may take place in a vacuum.

Figure 1C:
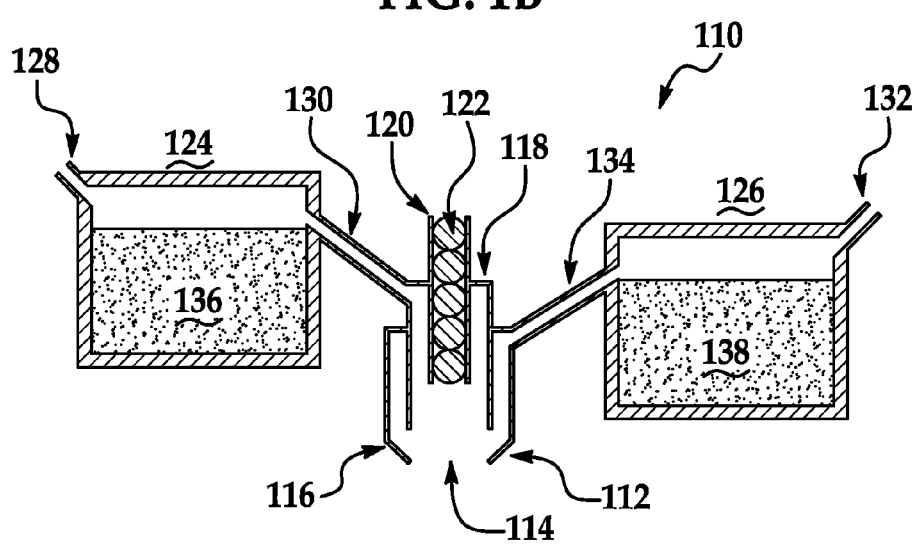
FIG. 1C is a schematic diagram of an exemplary extruder apparatus which is suitable for fabricating the magnetic fiber structure shown in FIG. 1B.

Referring next to FIG. 1C, an illustrative extruder apparatus 110 which is suitable for fabricating the magnetic fiber structure 101 shown in FIG. 1B is shown. The extruder apparatus 110 may include a triple nozzle 112 and feed tanks 124 and 126. The triple nozzle 112 may include an exit 114, an outer nozzle 116, a middle nozzle 118 and an inner nozzle 120. A first connecting tube 130 may connect the feed tank 124 to the middle nozzle 118. A second connecting tube 134 may connect the feed tank 126 to the outer nozzle 116.

Magnetic particles 122 may be delivered under pressure to the inner nozzle 120. The feed tank 124 may contain molten or softened material 136 which forms the inner tube 104 (FIG. 1B) of the magnetic fiber structure 101 as the molten or softened material 136 is distributed through the middle nozzle 118 and exit 114, respectively. The feed tank 126 may contain molten or softened material 138 which forms the outer tube 102 (FIG. 1B) of the magnetic fiber structure 101 as the molten or softened material 138 is distributed through the outer nozzle 116 and the exit 114, respectively. The magnetic particles 122 may form the magnetic particles 106 (FIG. 1B) as the magnetic particles 122 are distributed through the inner nozzle 120 and the exit 114, respectively. The feed tank 124 may have an entrance 128 through which the material 136 may be introduced to the feed tank 124. The feed tank 126 may have an entrance 132 through which the material 138 is introduced to the feed tank 126. The feed tanks 124 and 126 may be generally thermally insulated and may include heating devices (not shown), gas layer control devices (not shown) to control the chemistry and feed pressure to the nozzle 112, and stirring devices (not shown) to aid in the process. One or more pairs of the triple nozzles 112 may be connected to pairs of the feed tanks 124, 126.

Figure 1D:
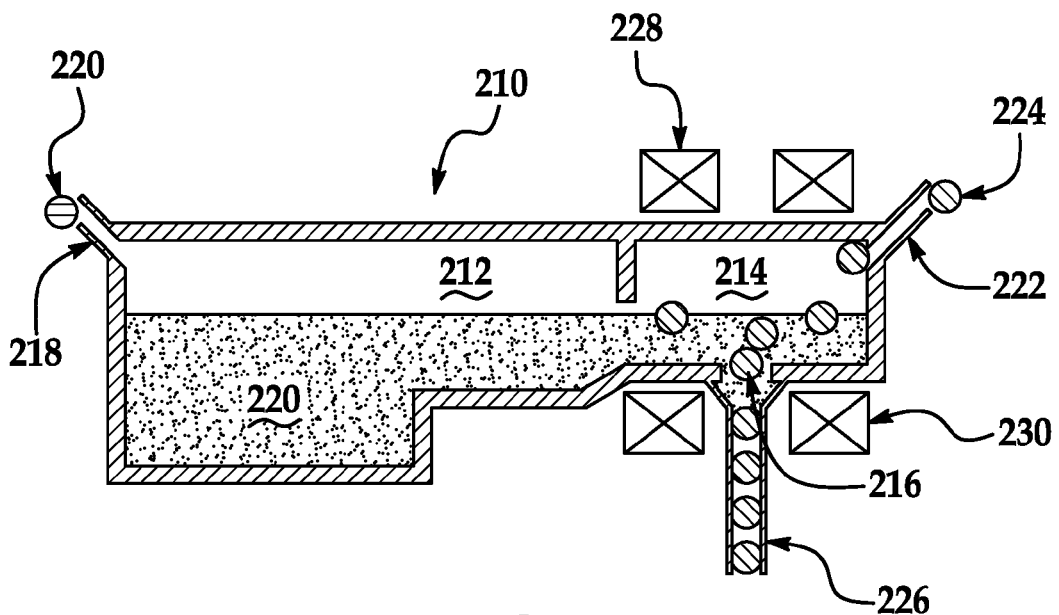
FIG. 1D is a schematic diagram of an alternative exemplary extruder apparatus which is suitable for fabricating the magnetic fiber structure shown in FIG. 1 or FIG. 1A.

Referring next to FIG. 1D, an alternative exemplary extruder apparatus 210 which is suitable for fabricating the magnetic fiber structure 101 shown in FIG. 1 or FIG. 1A is shown. In fabrication of the magnetic fiber structure 101 using the extruder apparatus 210, the magnetic particles 224 may be mixed in a slurry with the molten fiber material 220 and then drawn through a nozzle 216. The extruder apparatus 210 may include a furnace 212, a forehearth 214, the nozzle 216, an entrance 218 for fiber material 220 and an entrance 222 for magnetic particles 224. Magnetically-loaded fiber 226 exits the nozzle 216. The apparatus 210 may optionally include an upper electromagnet 228 or a lower electromagnet 230. This arrangement may be most effective if the temperature in the forehearth 214 is below the Curie temperature of the magnetic particles 224. In that case, the electromagnets 228 and 230 may be configured to provide one or more of the functions of: (1) controlling the effective buoyancy of the magnetic particles 224 in the molten fiber material 220; (2) stirring the magnetic particles 224 in the molten fiber material 220; (3) aiding the packing density of the magnetic particles 224 in the fiber 226 by causing an attractive force between adjacent particles 224; and (4) orienting the easy axis of magnetization of the magnetic particles 224 relative to the fiber 226. The magnetic field in the electromagnets 228, 230 may be DC, rotating, 3-phase or combinations thereof, for example and without limitation.

In an alternative embodiment (not shown), the fibers may be formed by first creating a perform including a fiber material slab into which magnetic particles are inserted using a hot press. The performs may then be inserted into an extruder, after which the fiber material is brought to a softening point and a fiber is extruded. Magnetic fields may be used as was heretofore described with respect to the extruder apparatus 210 in FIG. 1D.

Because typical packing densities for round fiber composites are limited to 76% fiber in theory, an alternate fiber shape may be desired to further increase the quantity of particle-loaded fiber that can be obtained. Using shaped fibers such as rectangular fibers can increase packing efficiency up to 90%+. Rectangular glass fibers have been fabricated at least since the late 1960's. A composite made in this manner may include high-strength rectangular glass fibers as well as highly particle loaded fibers or all highly particle loaded fibers.

Figure 2:
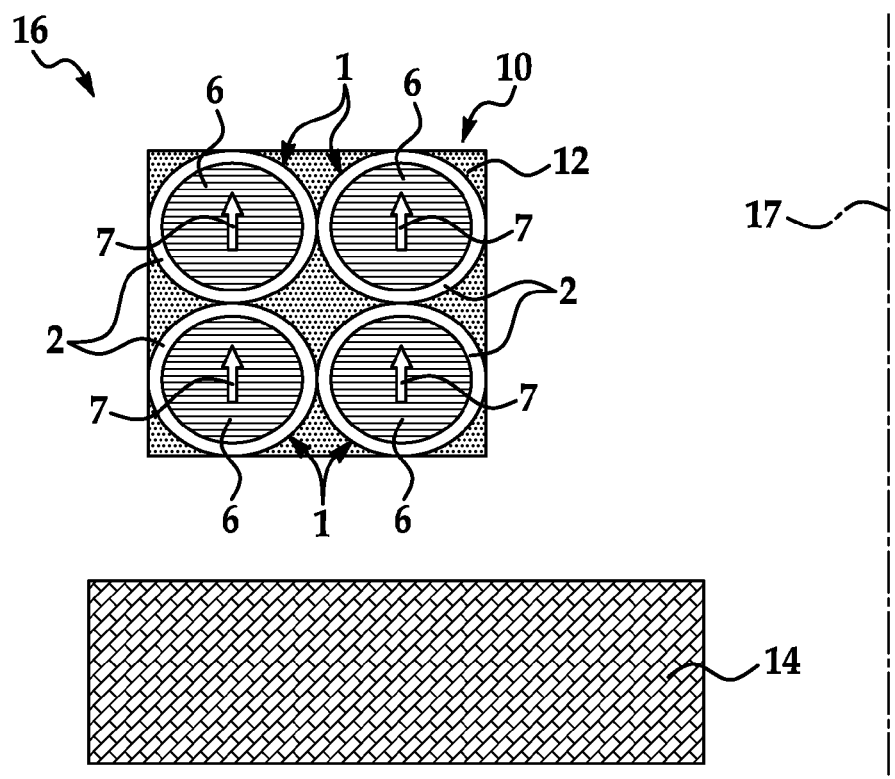
FIG. 2 is a transverse cross-sectional schematic view of an HTS bearing structure which utilizes the magnetic fiber structure shown in FIG. 1.

Referring next to FIG. 2, a magnetic composite structure 10 in which the magnetic fiber structure 1 of FIG. 1 is wound in a cylindrical configuration is shown. In some applications, the magnetic composite structure 10 may be part of an HTS bearing structure 16 in which the magnetic composite structure 10 is disposed above an HTS bearing ring 14. An axis of symmetry 17 of the magnetic composite structure 10 and the HTS bearing ring 14 is shown. In FIG. 2, the magnetic composite structure 10 is configured in a 2 fiber high by 2 fiber wide configuration in a polymer matrix 12. In an actual HTS bearing structure 16 or other device, the fiber count in cross-section may be significantly higher (e.g., 1000×1000 in a 1-cm high by 1-cm in radial direction ring). In FIG. 2, the PM particles 6 have been magnetized with the easy axis of magnetization 7 of each oriented in the vertical direction. A magnetic field may be applied to the PM particles 6 as the magnetic fiber structures 1 are being wound into the magnetic composite structure 10 such that the easy axes of magnetization 7 of the PM particles 6 are oriented in the same direction. In some applications, pure glass fibers (not shown) may be mixed into the polymer matrix 12 for strength purposes.

The polymer matrix 12 may be any type of polymeric material which is suitable for the purpose. A glass matrix or non-magnetic metal may be used in some applications. Processing of the composite may require alignment of the PM particles 6 during fabrication. This could be accomplished by curing the composite in the presence of a magnetic field. In addition to associating the PM particles 6 with fibers in the polymer matrix 12, either inside a hollow fiber tube 2 or on the outside of the fiber, the PM particles 6 can be placed in the polymer matrix 12 essentially in the interstices between the fibers. The PM particles 6 may float more or less freely in the polymer matrix 12 but may be rotated by a magnetic field such that the easy axis of magnetization 7 is along the direction of the magnetic field.

Because packing densities for round fiber composite materials may be limited to 76% fiber in theory, alternate fiber shapes may be desired to further increase the quantity of particle-loaded fiber tubes 2 that can be provided in the polymer matrix 12. Using shaped fibers such as rectangular fibers may increase the packing efficiency of the magnetic composite structure 10 to 90%. A magnetic composite structure 10 which is made in such a manner may include both high-strength rectangular glass fibers as well as highly-particle loaded fiber tubes 2 or all highly-loaded particle loaded fiber tubes 2.

Figure 3:
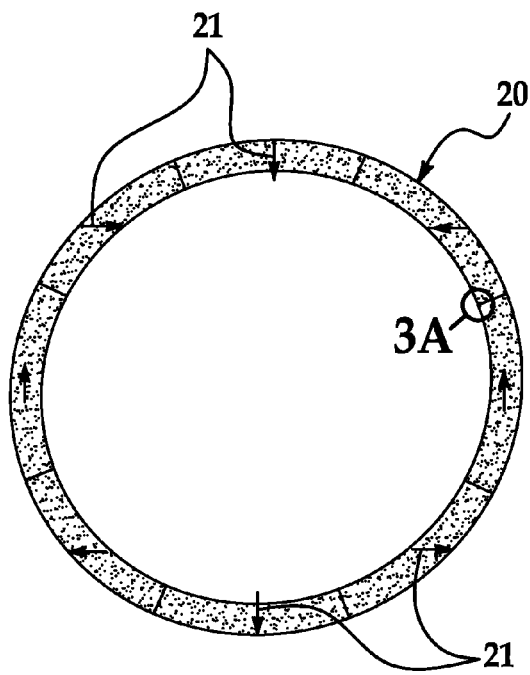
FIG. 3 is a top view of a filament-wound composite rotor with magnetization of Halbach array dipole.
Figure 3A:
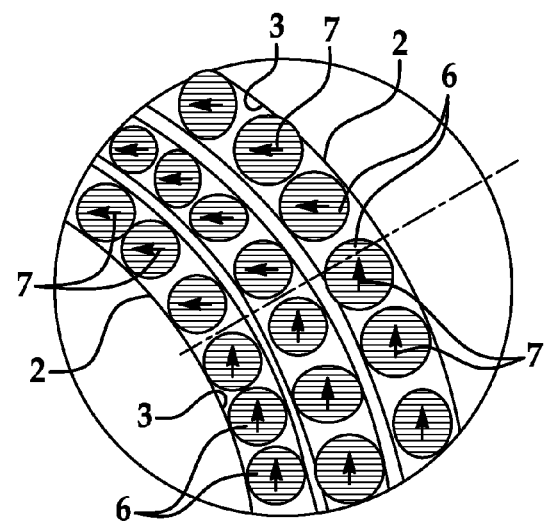
FIG. 3A is an enlarged sectional view taken along section line 3A in FIG. 3.

Referring next to FIGS. 3 and 3A, as the PM particles 6 are inserted into the tube interior 3 of the fiber tube 2, the direction of the magnetic field 21 can change as the length of the fiber tube 2 increases such that the easy axis of magnetization 7 rotates when the magnetic fiber structures 1 are wound into a magnetic composite ring structure 20. This may allow rotor rings to be magnetized into structures that facilitate use in motors and generators such as the Halbach ring structure 20 which is illustrated in FIG. 3.

Figure 4:
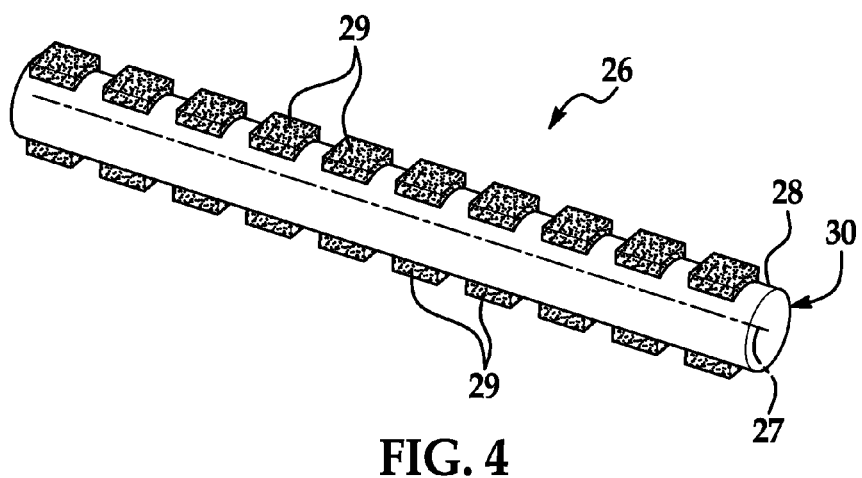
FIG. 4 is a perspective view of a magnetic fiber structure with permanent magnet particles provided on an exterior surface of a fiber.

Referring next to FIG. 4, an alternative illustrative embodiment of the magnetic fiber structure 26 may include an elongated fiber 30 having a longitudinal axis 27. In some embodiments, the fiber 30 may be any of the same materials as were set forth herein above with respect to the fiber tubes 2 in FIG. 1. The fiber 30 may be a solid fiber or a fiber tube. In some embodiments, the fiber 30 may be a glass fiber with carbon nanofiber reinforcement. PM particles 29 may be provided on an exterior fiber surface 28 of the fiber 30. In the illustrative embodiment shown in FIG. 4, the PM particles 29 are shown attached to the exterior fiber surface 28 in a regular pattern and arranged in two rows on opposite sides of the fiber 30. Such geometry of the PM particles 29 may facilitate alignment of the easy axis of magnetization 7 transverse to the longitudinal axis 27 of the fiber 30. In other embodiments, the PM particles 29 may be attached to the exterior fiber surface 28 of the fiber 30 in other geometries.

The magnetic fiber structure 26 may be fabricated according to any of a variety of fabrication methods. In some methods of fabrication, the fiber 30 may be heated to its softening point after which the PM particles 29 may be pressed onto the exterior fiber surface 28 of the fiber 30. The fiber 30 may deform slightly to accommodate the PM particles 29 and then solidify as it cools, effectively locking the PM particles 29 in place on the exterior fiber surface 28. Each PM particle 29 may be coated with a thin buffer layer 8 (FIG. 1) to prevent chemical interaction between the PM particle 29 and the fiber 30. In some embodiments, the PM particles 29 may be in the form of flakes, as in a melt-spun process such as that used to make Magnequench PMs.

Figure 5:
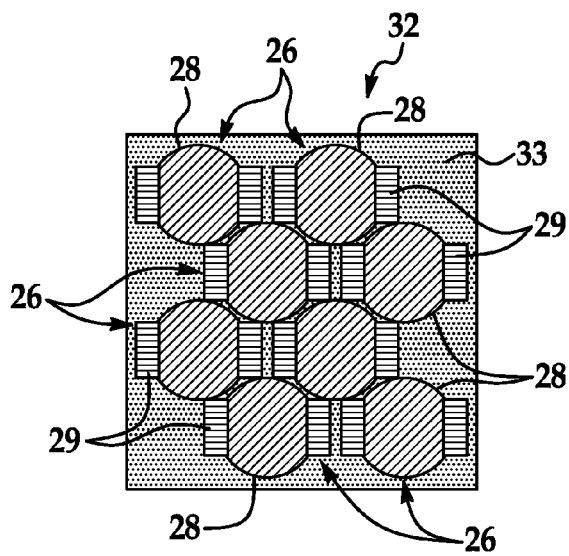
FIG. 5 is a cross-sectional view which illustrates an exemplary winding geometry of the magnetic fiber structure shown in FIG. 4.

Referring next to FIG. 5, a magnetic composite structure 32 in which the magnetic fiber structure 26 (FIG. 4) is wound in a winding geometry in a polymer matrix 33 is shown. In the magnetic composite structure 32, a 2 wide by 4 high magnetic fiber structure 26 is embedded in the polymer matrix 33. In this geometry of the magnetic composite structure 32, the exterior fiber surfaces 28 of the staggered or interlocking magnetic fiber structures 26 may push against each other.

Figure 6:
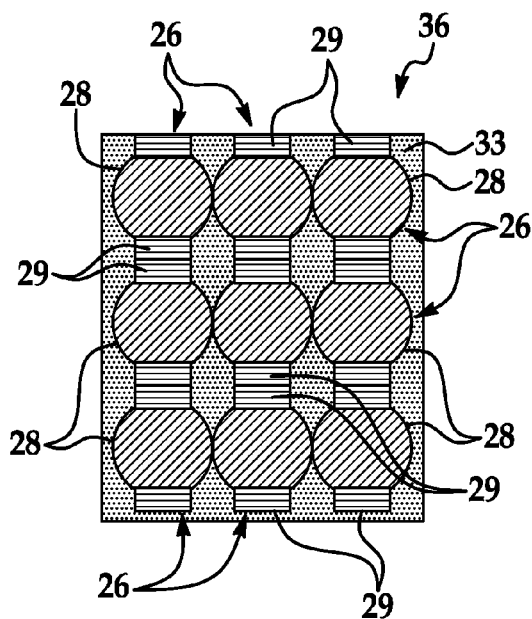
FIG. 6 is a cross-sectional view which illustrates an alternative exemplary winding geometry of the magnetic fiber structure shown in FIG. 4.

Referring next to FIG. 6, a magnetic composite structure 36 in which the magnetic fiber structure 26 (FIG. 4) is wound in an alternative winding geometry in a polymer matrix 33 is shown. In the magnetic composite structure 36, a 3 high by 3 wide array of the adjacent segments of the magnetic fiber structure 26 is embedded in the polymer matrix 33. Accordingly, if the rotor (not shown) of which the magnetic composite structure 36 is a part spins about a vertical axis, the centrifugal force applied against the magnetic fiber structure 26 will be in the horizontal direction and the adjacent segments of the magnetic fiber structure 26 will push against each other although the individual PM particles 29 will be constrained by the combination of the adjacent segments of the fiber structure 26 and the polymer matrix 33.

Figure 7:
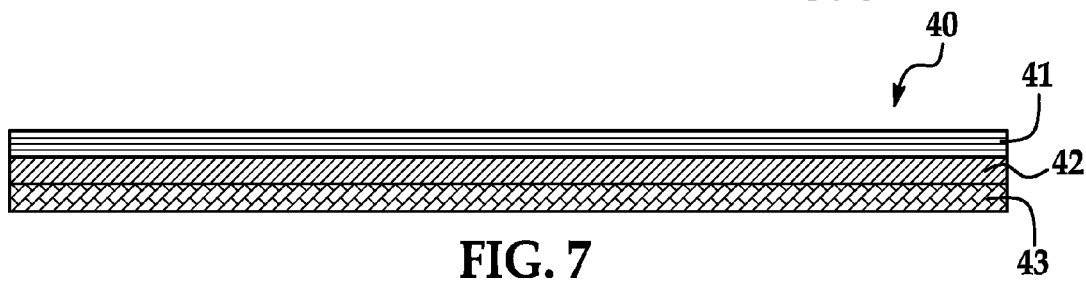
FIG. 7 is a longitudinal sectional view of a three-layered magnetic fiber structure.
Figure 8:
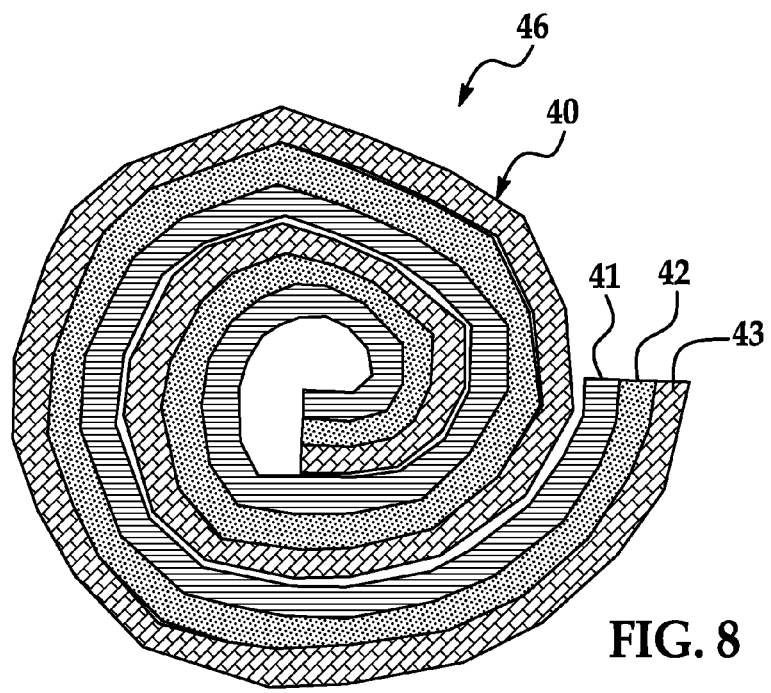
FIG. 8 is an alternative illustrative embodiment of a magnetic composite structure which utilizes the magnetic fiber structure shown in FIG. 7 rolled to form an elongated fiber.

Referring next to FIGS. 7 and 8, another alternative illustrative embodiment of the magnetic fiber structure 46 (FIG. 8) may be formed by jelly-rolling a multi-layered sheet structure 40 (FIG. 7). In some embodiments, the multi-layered sheet structure 40 may include a magnetic layer 41; a substrate layer 42 adjacent to the magnetic layer 41; and a carbon nanofiber layer 43 adjacent to the substrate layer 42. The magnetic layer 41 may be a film of PM material in which PM particles may be incorporated into the film. The substrate layer 42 may be a polymer or other material such as glass or high-strength metal. The carbon nanofiber layer 43 may be a woven mat of carbon nanofibers.

As shown in FIG. 8, the multi-layered sheet structure 40 of FIG. 7 may be rolled up to form an elongated magnetic fiber structure 46. In FIG. 8, the longitudinal axis of the magnetic fiber structure 46 extends out of the plane of the drawing. In the exemplary embodiment of the magnetic fiber structure 46 shown in FIG. 8, 2 and ¼ turns of the multi-layered sheet structure 40 are shown. In other embodiments, more turns of the multi-layered sheet structure 40 may be used to fabricate the magnetic fiber structure 46. In some applications, multiple magnetic fiber structures 46 may be woven together in a manner which is similar to the manufacture of ropes to fabricate arbitrarily long fibers. In fabrication of a magnetic composite structure (not shown), the magnetic fiber structure 46 may be wound and incorporated into a polymer matrix (not shown).

Figure 9:
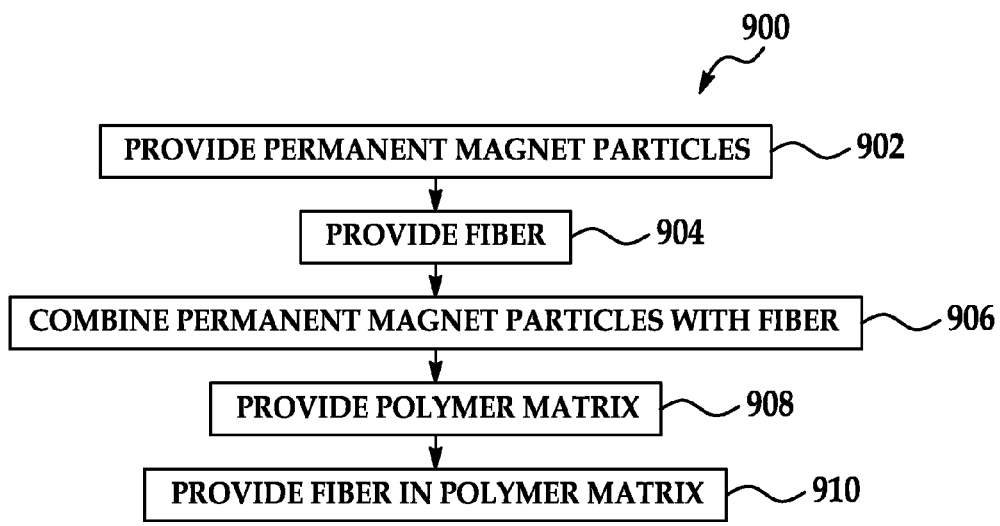
FIG. 9 is a flow diagram of a general method for fabricating magnetic composite structures with high mechanical strength.

Referring next to FIG. 9, a flow diagram 900 of a general method for fabricating a magnetic composite structure with high mechanical strength is shown. In block 902, permanent magnet particles (PMs) are provided. In block 904, a fiber is provided. In block 906, the permanent magnet particles are combined with the fiber. In block 908, a polymer matrix is provided. In block 910, the fiber is provided in the polymer matrix.

Figure 10:
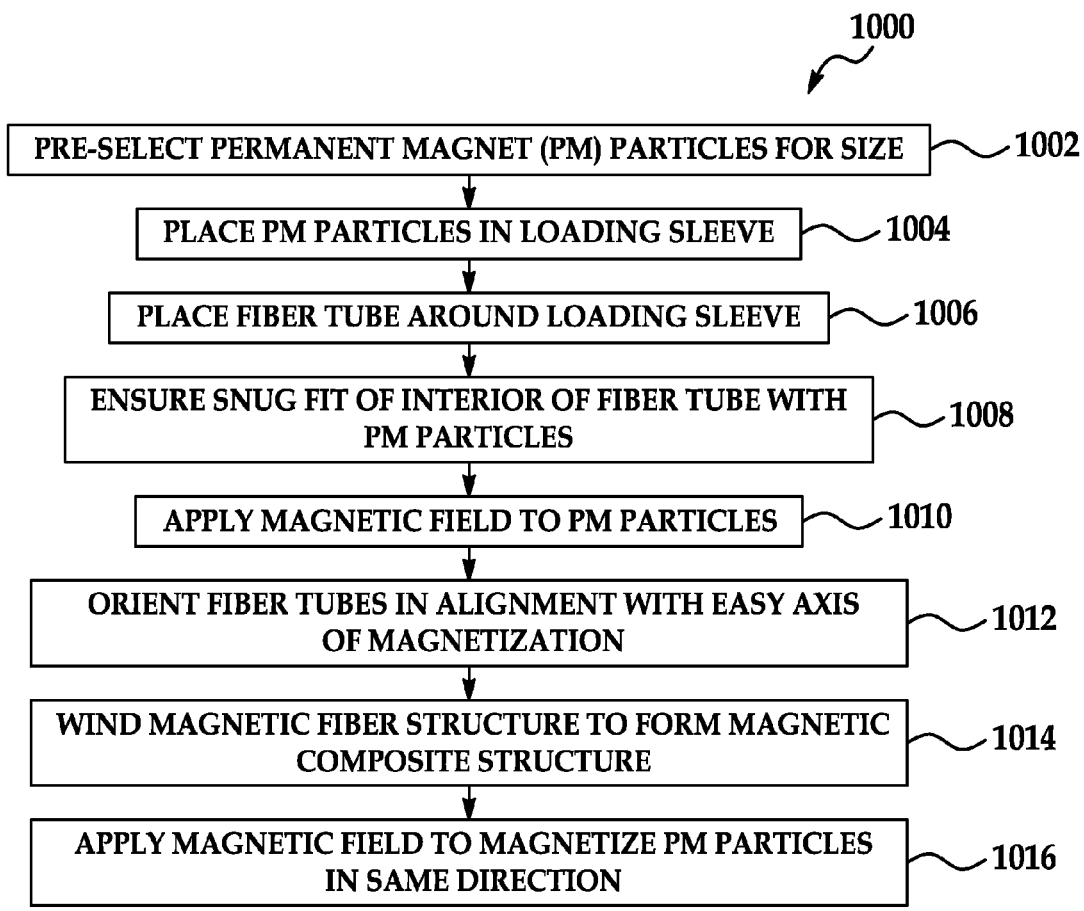
FIG. 10 is a flow diagram of an illustrative method for fabricating magnetic composite structures with high mechanical strength.

Referring next to FIG. 10, a flow diagram 1000 of an illustrative method for fabricating a magnetic composite structure with high mechanical strength is shown. The fabrication method of the flow diagram 1000 which is shown in FIG. 9 may be suitable for fabrication of the magnetic fiber structure 1 which was heretofore described with respect to FIG. 1 and the magnetic composite structure 10 which was heretofore described with respect to FIG. 2. In block 1002, permanent magnet (PM) particles are pre-selected for size. In block 1004, the PM particles are placed in a loading sleeve. In block 1006, a fiber tube is placed around the loading sleeve. In block 1008, a snug fit of the interior of the fiber tube with the PM particles in ensured. In block 1010, a magnetic field is applied to the PM particles. In block 1012, the fiber tubes are oriented in alignment with an easy axis of magnetization. In block 1014, the magnetic fiber structure is wound to form the magnetic composite structure. In block 1016, a magnetic field may be applied to the magnetic fiber structure to magnetize the PM particles in the same direction.

Figure 11:
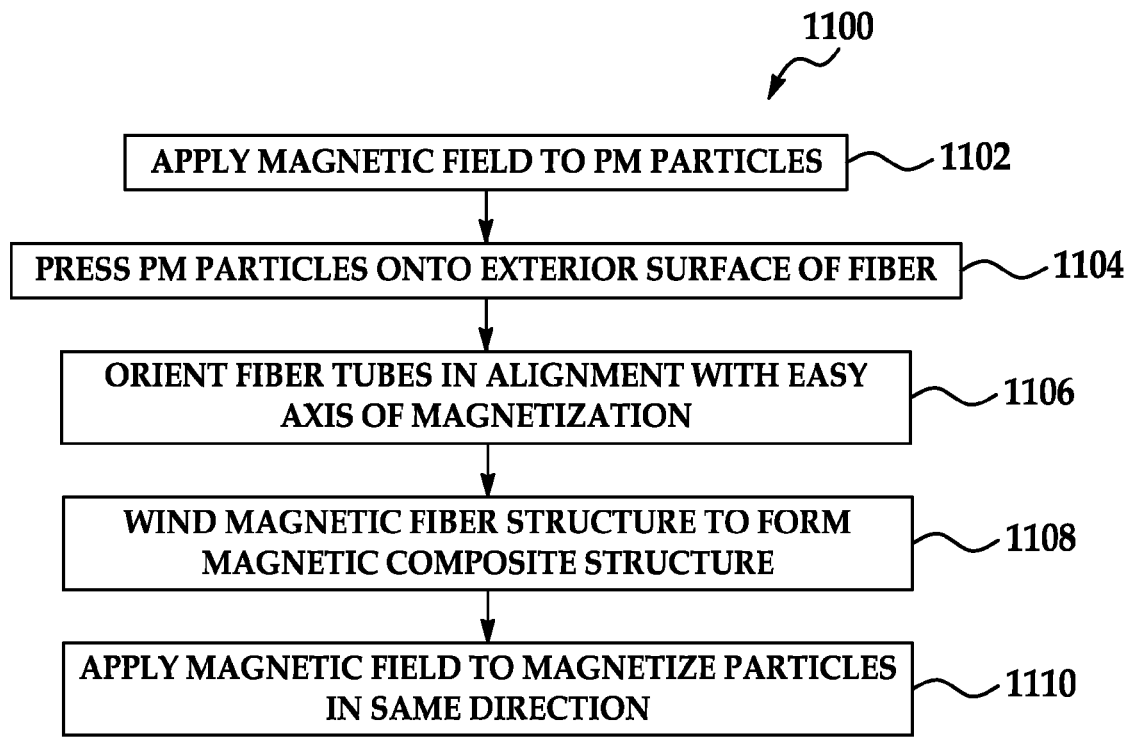
FIG. 11 is a flow diagram of an alternative illustrative method for fabricating magnetic composite structures with high mechanical strength.

Referring next to FIG. 11, a flow diagram 1100 of an alternative illustrative method for fabricating magnetic composite structures with high mechanical strength is shown. The fabrication method of the flow diagram 1100 which is shown in FIG. 11 may be suitable for fabrication of the magnetic fiber structure 26 which was heretofore described with respect to FIG. 4 and the magnetic composite structures 32 which was heretofore described with respect to FIG. 5 and the magnetic composite structure 36 which was heretofore described with respect to FIG. 6. In block 1102, a magnetic field is applied to PM particles. In block 1104, the PM particles are pressed onto the exterior surface of a fiber. In block 1106, the fiber tubes are oriented in alignment with an easy axis of magnetization. In block 1108, the magnetic fiber structure is wound to form the magnetic composite structure. In block 1110, a magnetic field may be applied to the magnetic fiber structure to magnetize the PM particles in the same direction.

Figure 12:
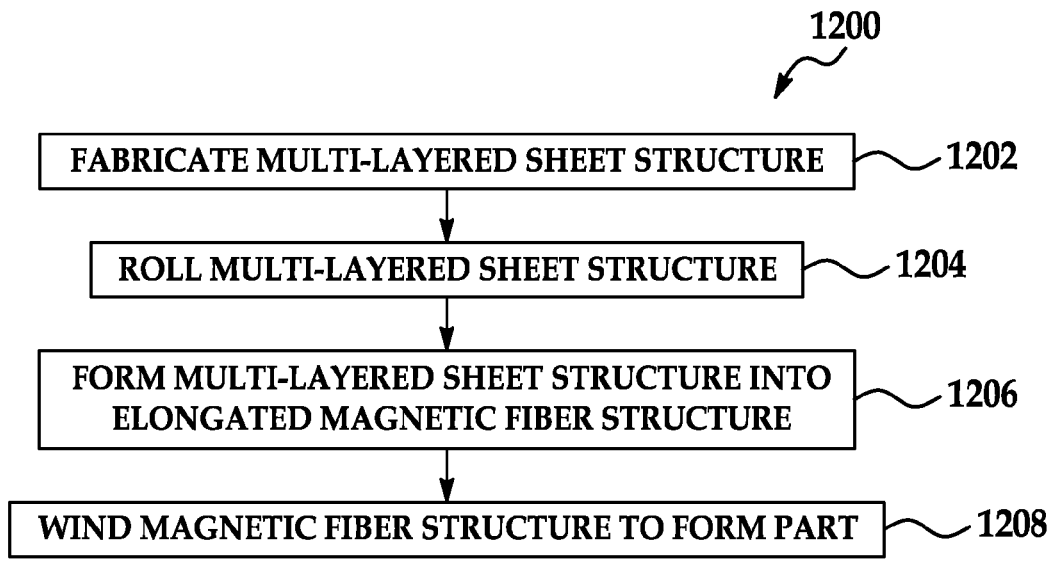
FIG. 12 is a flow diagram of another alternative illustrative method for fabricating magnetic composite structures with high mechanical strength.

Referring next to FIG. 12, a flow diagram 1200 of another alternative illustrative method for fabricating a magnetic composite structure with high mechanical strength is shown. In block 1202, a multi-layered sheet structure is fabricated. In block 1204, the multi-layered sheet structure is rolled. In block 1206, the rolled multi-layered sheet structure is formed into an elongated magnetic fiber structure. In block 1208, the magnetic fiber structure is wound to form a part.

Figure 13:
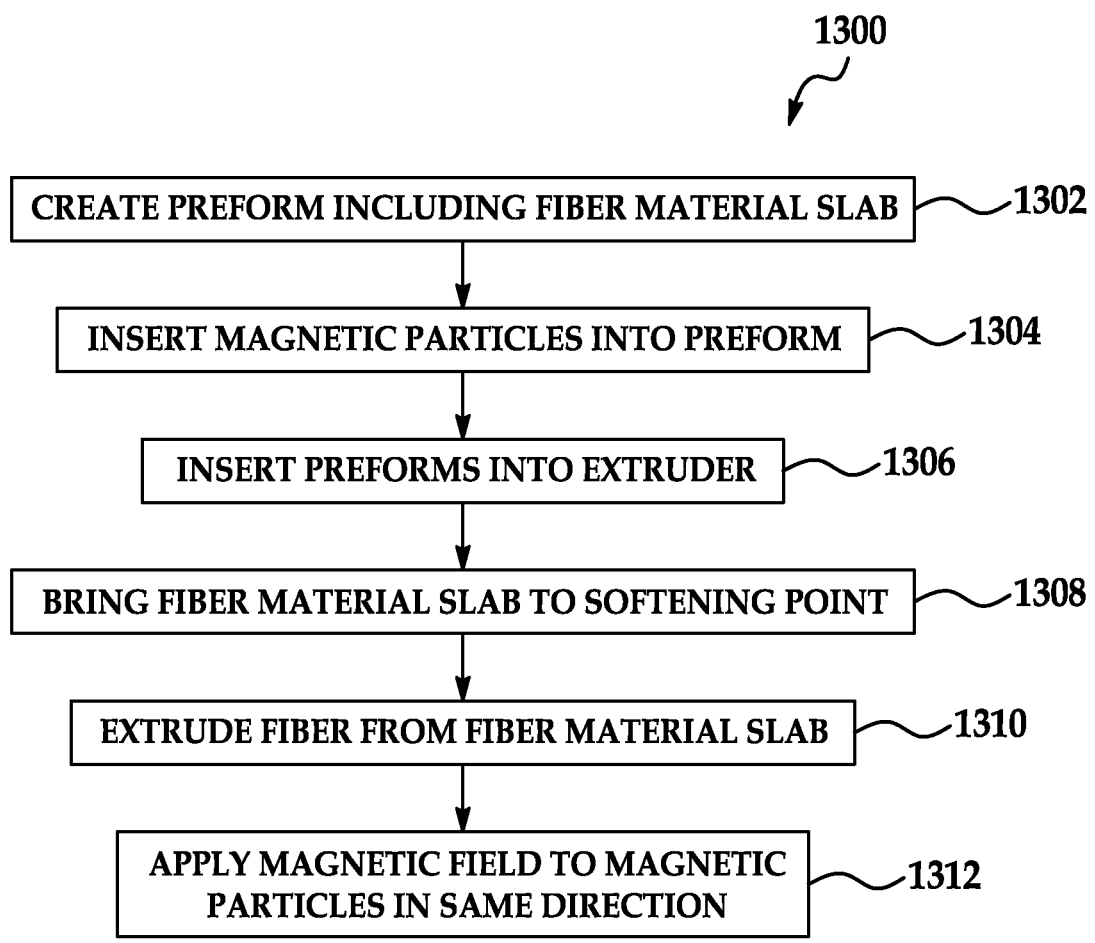
FIG. 13 is a flow diagram of another alternative illustrative method for fabricating magnetic composite structures with high mechanical strength.

Referring next to FIG. 13, a flow diagram 1300 of another alternative illustrative method for fabricating a magnetic composite structure with high mechanical strength is shown. In block 1302, a preform including a fiber material slab is created. In block 1304, magnetic particles are inserted into the preform. In block 1306, the preforms are inserted into an extruder. In block 1308, the fiber material slab is brought to a softening point. In block 1310, a fiber is extruded from the fiber material slab. In block 1312, a magnetic field may be applied to magnetize the magnetic particles in the same direction.

Although the embodiments of this disclosure have been described with respect to certain exemplary embodiments, it is to be understood that the specific embodiments are for purposes of illustration and not limitation, as other variations will occur to those of skill in the art.

The invention claimed is:

1. A magnetic fiber structure, comprising:
    a fiber; and
    a plurality of permanent magnet particles carried by said fiber, the plurality of permanent magnet particles configured in a layer having a thickness of a single permanent magnet particle in the plurality of permanent magnet particles.

2. The magnetic fiber structure of claim 1 wherein the plurality of permanent magnet particles are configured in a regular pattern on an exterior surface of said fiber.

3. The magnetic fiber structure of claim 2 wherein the plurality of permanent magnet particles are arranged in a pair of rows on opposite sides of said fiber.

4. The magnetic fiber structure of claim 1 wherein the fiber comprises a fiber tube having a tube interior and wherein the plurality of permanent magnet particles are configured in the tube interior.

5. The magnetic fiber structure of claim 4 wherein each of the plurality of permanent magnet particles has an axis of magnetization disposed in perpendicular relationship with respect to a longitudinal axis of the fiber.

6. The magnetic fiber structure of claim 1 wherein the fiber is fiberglass, graphite, a glass fiber with carbon nanofiber reinforcement, or polymeric.

7. A magnetic composite structure, comprising:
    a polymer matrix; and
    a magnetic fiber structure provided in said polymer matrix and comprising:
        a fiber; and
        a plurality of permanent magnet particles carried by the fiber, the plurality of permanent magnet particles configured in a layer having a thickness of a single permanent magnet particle in the plurality of permanent magnet particles.

8. The magnetic composite structure of claim 7 wherein the magnetic fiber structure is disposed in a winding pattern in the polymer matrix.

9. The magnetic composite structure of claim 7 wherein the plurality of permanent magnet particles are provided on an exterior surface of the fiber.

10. The magnetic composite structure of claim 9 wherein the plurality of permanent magnet particles are arranged in a pair of rows on opposite sides of said fiber.

11. The magnetic composite structure of claim 7 wherein the fiber comprises a fiber tube having a tube interior and wherein the plurality of permanent magnet particles are provided in the tube interior.

12. The magnetic fiber structure of claim 11 wherein each of the plurality of permanent magnet particles has an axis of magnetization disposed in perpendicular relationship with respect to a longitudinal axis of the fiber.

13. The magnetic fiber structure of claim 7 wherein the fiber is fiberglass, graphite, a glass fiber with carbon nanofiber reinforcement, or polymeric.

14. A magnetic fiber structure, comprising:
    a fiber; and
    a plurality of permanent magnetic particles configured in the fiber, wherein the plurality of permanent magnetic particles comprises a single column of permanent magnetic particles in the fiber.

15. The magnetic fiber structure of claim 14 wherein each of said plurality of permanent magnetic particles has an easy axis of magnetization oriented in generally transverse relationship with respect to a longitudinal axis of the fiber.

16. The magnetic fiber structure of claim 14, wherein the fiber comprises a fiber tube having a tube interior and wherein the plurality of permanent magnet particles are configured in said tube interior.

17. The magnetic fiber structure of claim 14, wherein the fiber comprises an outer tube and an inner tube within the outer tube, wherein the plurality of permanent magnetic particles are configured within the inner tube, and further wherein the plurality of permanent magnetic particles comprises a single column of permanent magnetic particles in the inner tube.

18. The magnetic fiber structure of claim 17 wherein said outer tube has a first coefficient of thermal expansion and said inner tube has a second coefficient of thermal expansion greater than said first coefficient of thermal expansion.

19. The magnetic fiber structure of claim 1 wherein each permanent magnet particle in the plurality of magnet particles is mechanically supported by the fiber.

20. A magnetic fiber structure, comprising:
    a magnetic layer comprising a plurality of permanent magnetic particles;
    a substrate layer adjacent to the magnetic layer; and a carbon nanofiber layer adjacent to the substrate layer, the magnetic layer, substrate layer, and carbon nanofiber layer concurrently rolled into a cylindrical structure.

21. The magnetic fiber structure of claim 20 wherein the substrate layer is selected from one of: a polymer, glass, or metal.

* * * * *